(12) United States Patent
Sherlekar

(10) Patent No.: US 8,513,978 B2
(45) Date of Patent: Aug. 20, 2013

(54) POWER ROUTING IN STANDARD CELL DESIGNS

(75) Inventor: Deepak D. Sherlekar, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/419,321

(22) Filed: Mar. 13, 2012

(65) Prior Publication Data

US 2012/0249182 A1 Oct. 4, 2012

Related U.S. Application Data

(60) Provisional application No. 61/469,489, filed on Mar. 30, 2011.

(51) Int. Cl.
*H01L 25/00* (2006.01)
*H03K 19/00* (2006.01)
*G06F 17/50* (2006.01)

(52) U.S. Cl.
USPC ............... 326/101; 326/41; 716/55; 716/126

(58) Field of Classification Search
USPC ......... 326/37–41, 47, 101; 327/334; 716/55, 716/120; 257/207, 208
See application file for complete search history.

(56) References Cited

U.S. PATENT DOCUMENTS

| | | | |
|---|---|---|---|
| 5,943,243 A | 8/1999 | Sherlekar et al. | |
| 6,091,090 A | 7/2000 | Gheewala | |
| 6,617,621 B1 | 9/2003 | Gheewala et al. | |
| 6,838,713 B1 * | 1/2005 | Greewala et al. | 257/211 |
| 7,069,522 B1 | 6/2006 | Sluss et al. | |
| 7,129,562 B1 | 10/2006 | Gheewala et al. | |
| 7,219,324 B1 | 5/2007 | Sherlekar et al. | |
| 7,603,634 B2 | 10/2009 | Sluss et al. | |
| 7,895,548 B2 * | 2/2011 | Lin et al. | 716/55 |
| 7,989,849 B2 | 8/2011 | Sherlekar et al. | |
| 2001/0034873 A1 | 10/2001 | Arsintescu | |
| 2005/0081176 A1 * | 4/2005 | Ohshige | 716/13 |
| 2006/0048079 A1 * | 3/2006 | Dirks et al. | 716/3 |
| 2006/0117283 A1 * | 6/2006 | Katou et al. | 716/5 |
| 2006/0198228 A1 | 9/2006 | Sluss et al. | |
| 2007/0157144 A1 * | 7/2007 | Mai et al. | 716/10 |
| 2007/0180419 A1 * | 8/2007 | Sherlekar et al. | 716/9 |
| 2008/0111158 A1 * | 5/2008 | Sherlekar et al. | 257/207 |
| 2009/0108360 A1 | 4/2009 | Smayling et al. | |
| 2010/0097875 A1 | 4/2010 | Vinke et al. | |

(Continued)

OTHER PUBLICATIONS

PCT International Search Report and Written Opinion, PCT Application No. PCT/US12/26177, Jun. 29, 2012, 12 pages.

(Continued)

*Primary Examiner* — Shawki Ismail
*Assistant Examiner* — Dylan White
(74) *Attorney, Agent, or Firm* — Fenwick & West LLP

(57) ABSTRACT

A cell-based architecture for an integrated circuit. A row of cell instances borders a first adjacent row of cell instances along a first boundary and a second adjacent row of cell instances along a second boundary. A first power rail (e.g., carrying an auxiliary voltage) extends along the first boundary. A second power rail (e.g., VSS) extends along the second boundary. The second power rail is wider than the first power rail. Additionally, a third power rail (e.g., VDD) extends across the interior of the second row of cells.

24 Claims, 9 Drawing Sheets

(56) References Cited

U.S. PATENT DOCUMENTS

2010/0155783 A1    6/2010   Law et al.
2010/0181600 A1    7/2010   Law et al.
2011/0078639 A1*   3/2011   Lin et al. .......................... 716/55
2012/0241986 A1*   9/2012   Sherlekar et al. ............. 257/784

OTHER PUBLICATIONS

PCT International Search Report and Written Opinion, PCT Application No. PCT/US12/30777, Jun. 22, 2012, 13 pages.

* cited by examiner

POWER ROUTING IN STANDARD CELL DESIGNS

CROSS-REFERENCE TO RELATED APPLICATIONS

This application claims priority under 35 U.S.C. §119(e) to U.S. Provisional Patent Application Ser. No. 61/469,489, "Power Routing in Standard Cell Designs," filed Mar. 30, 2011, which is incorporated herein by reference in its entirety.

BACKGROUND

1. Field of Art

The disclosure generally relates to the field of electronic design automation (EDA), and more specifically to routing of power rails for a standard cell that is used to design integrated circuits (ICs).

2. Description of the Related Art

Computer-aided cell-based design has been developed for quickly designing large scale ICs such as application specific integrated circuits (ASICs) and gate arrays. The cell is a circuit that has been pre-designed and pre-verified as a building block. Design technologies known as standard cell and gate array use different types of such building blocks. In a standard cell design, each distinct cell in a library may have unique geometries of active, gate, and metal levels. With gate arrays, however, each gate array cell shares the same building block, called a core cell that includes fixed active and gate level geometries. Different gate array cells are implemented using only metal interconnections between the active and gate elements of one or more core cells. Examples of a standard cell or gate array cell include an inverter, a NAND gate, a NOR gate, a flip flop, and other similar logic circuits.

During the process of designing an integrated circuit, a designer may select particular cells from a library of cells and use them in a design. The library includes cells that have been designed for a given integrated circuit (IC) manufacturing process, such as complementary metal oxide semiconductor (CMOS) fabrication. The cells generally have a fixed height but a variable width, which enables the cells to be placed in rows. Cells do not change from one design to the next, but the way in which they are interconnected will, to achieve the desired function in a given design. By being able to select the cells from the library for use in the design, the designer can quickly implement a desired functionality without having to custom design the cells. The designer will thus have a certain level of confidence that the integrated circuit will work as intended when manufactured without having to worry about the details of the individual transistors that make up each cell.

Cell based designs have power rails that supply voltage potentials such as VDD or VSS to the cells. The VDD or VSS power rails may be disabled during a standby mode to conserve power. For quick wake-up from standby mode, some cells are retention registers that save state information during standby. In standby mode, the retention registers are powered by a retention voltage that remains on even though the primary supply voltage is disabled. Retention registers may be placed unconstrained throughout the integrated circuit which requires the retention voltage to be routed on a retention rail across every cell row for optimum routing efficiency.

Conventional cells are designed with the primary power rails (e.g., VDD and VSS) at the top and bottom boundaries of the cells, which allows the power rails to be shared between adjacent rows of cells. Some designs contain two power supplies: the primary supply VDD, which can be turned off to save power when the block is inactive, and a retention supply VDDR, which is always on. The retention supply is used to save the state of a block when the primary supply VDD is turned off, so that when it is turned back on, it can resume operation without having to reset its state and begin from scratch. The power rail carrying the retention voltage ("retention rail") is routed across the interior of the cell so that each row of cells has its own dedicated retention rail. However, adding a dedicated retention rail to a cell increases the cell height or takes away a routing track which could otherwise be used to route global signals for connecting the pins of the cells. Additionally, having a retention rail dedicated to just one row of cells is wasteful because retention rails only carry a fraction of the current of a primary power rail such as VDD.

SUMMARY

Embodiments of the present disclosure relate to a cell-based architecture for an integrated circuit design. In one embodiment, an integrated circuit implements a cell-based architecture comprising a row of cell instances bordering a first adjacent row of cell instances along a first boundary and a second adjacent row of cell instances along a second boundary. A first power rail (e.g., carrying an auxiliary voltage) extends along the first boundary. A second power rail (e.g., VSS) is extends along the second boundary. The second power rail is wider than the first power rail, which enables the second power rail to carry more current. Additionally, a third power rail (e.g., VDD) extends across the interior of the second row of cells.

The first power rail can be shared between rows of cell instances, which reduces the size of the cells when the first power rail is used in a design, and thus also reduces the size of the integrated circuit created from the cell instances. Additionally, having a second power rail that is wider than the first power rail is beneficial in configurations where the second power rail carries more current than the first power rail. In some embodiments, the height of the cell is a non-integral multiple of the routing pitch. For example, the cell height may be an odd multiple of half the routing pitch (e.g., 9.5, 10.5) so that one boundary of the cell is on-track and the other boundary of the cell is on the half-track. This enables the first power rail and the second power rail to be of different widths while still maintaining proper alignment with the routing tracks.

In one embodiment, a non-transitory computer-readable medium stores a cell library that includes a plurality of cells for an integrated circuit design. Each of the cells comprises a first power rail extending along a first boundary of the cell and a second power rail extending along a second boundary of the cell that is opposite from the first boundary. The second power rail is wider than the first power rail. A third power rail extends across an interior of the cell.

In one embodiment, a method is disclosed for generating a representation of the integrated circuit. One or more cells are received from a cell library. Instances of the one or more cells are arranged into the representation of the integrated circuit to form a row of cell instances bordering a first adjacent row of cell instances along a first boundary and a second adjacent row of cell instances along a second boundary. The arrangement of the cell instances forms a first power rail extending along the first boundary, a second power rail extending along the second boundary that is wider than the first power rail, and a third power rail extending across an interior of the row of cell instances.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
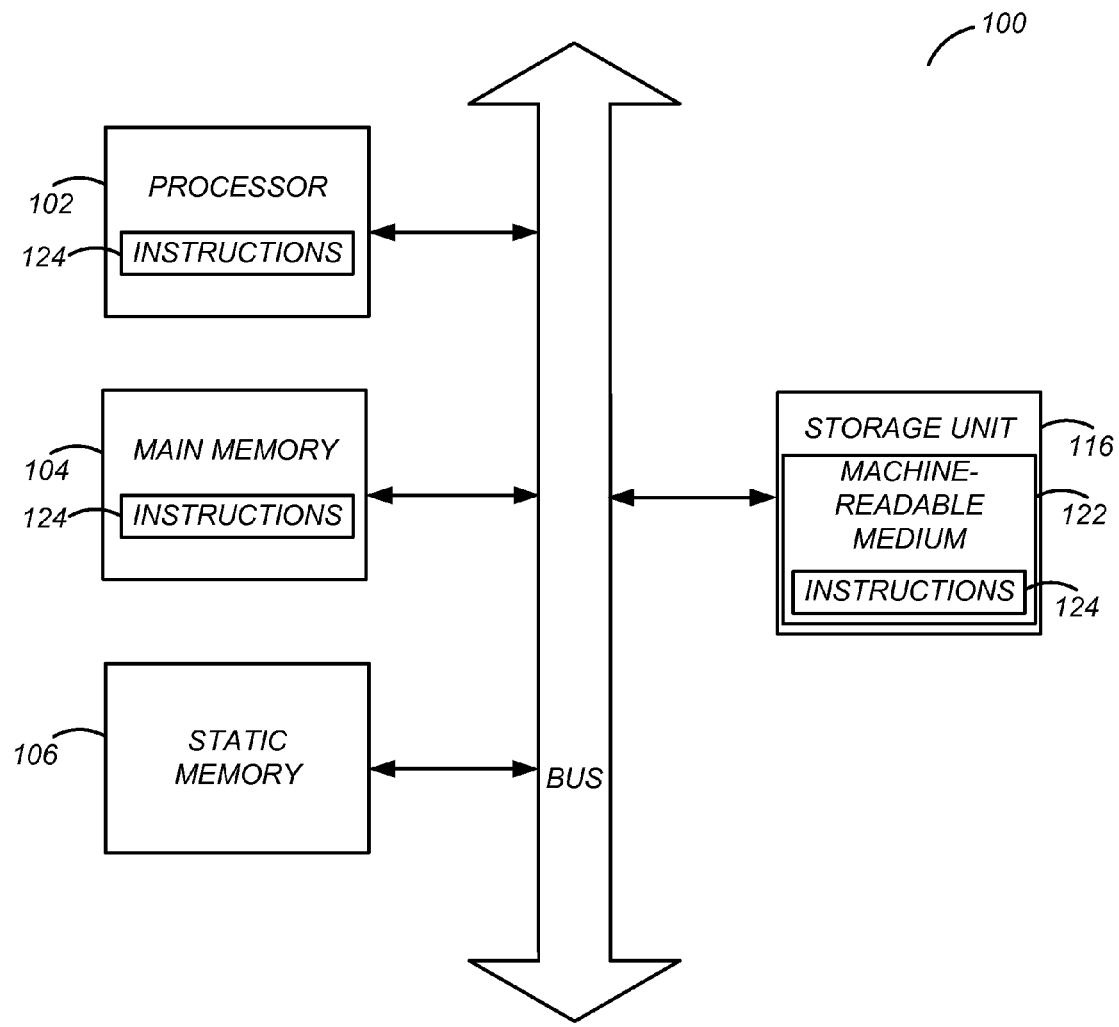
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments include a cell-based architecture for an integrated circuit design. The cells are designed so that a first power rail (e.g., auxiliary voltage) extends along one boundary of the cell. A second power rail (e.g., VSS) extends along the opposite boundary. A third power rail (e.g., VDD) extends across the interior of the cell. When instances of the cells are placed into flipped and abutted rows of an integrated circuit design, adjacent rows of cell instances share the power rails at the boundaries of the cells. Sharing the first power rail (e.g., retention voltage) between cell rows is beneficial for reducing the height of the cells when the current requirements of the first power rail are not high. In embodiments, the second power rail (e.g., VSS) is wider than the first power rail because the second power rail has higher current requirements. To ensure that the asymmetric power rails remain on the routing tracks, the top and bottom boundaries of the cells are adjusted to align with the routing tracks or to sit between two adjacent routing tracks, depending on the width of the power rails.

A cell described herein refers to predefined circuit unit or circuit element that is provided, as part of a cell library of many different types of circuit units, to an integrated circuit designer; the cell is re-used by placing instances of the cell into a representation of an integrated circuit as needed to make up the representation of the integrated circuit. For example, a cell may be an inverter, a NAND gate, a NOR gate, a flip flop, and other similar logic circuits. Each cell has a boundary, typically consisting of four edges that form a rectangular shape. As used herein, a standard cell refers to a cell with a predefined layout that is used in conjunction with other standard cells to implement a desired functionality of an integrated circuit. Standard cells may have fixed active and gate level geometries. Standard cells have a fixed height but variable width, which allows instances of the standard cells to be placed side by side in rows. Embodiments of this disclosure will be described with reference to standard cells. The principles described herein are applicable to both standard cells and other cells such as gate array cells.

A power rail described herein refers to structures in an integrated circuit that are primarily used to provide power to and return power from devices in the integrated circuit. For example, a power rail may be formed from metal traces routed in a metal layer. Power rails may carry different voltage potentials, such as a VDD voltage potential, VSS voltage potential, retention voltage potential, or other types of voltage potentials. Routing tracks described herein refer to reference lines that define the preferred center of metal wires within a given metal layer.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), a main memory 104, a static memory 106, and a storage unit 116 which are configured to communicate with each other via a bus 108. The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2:
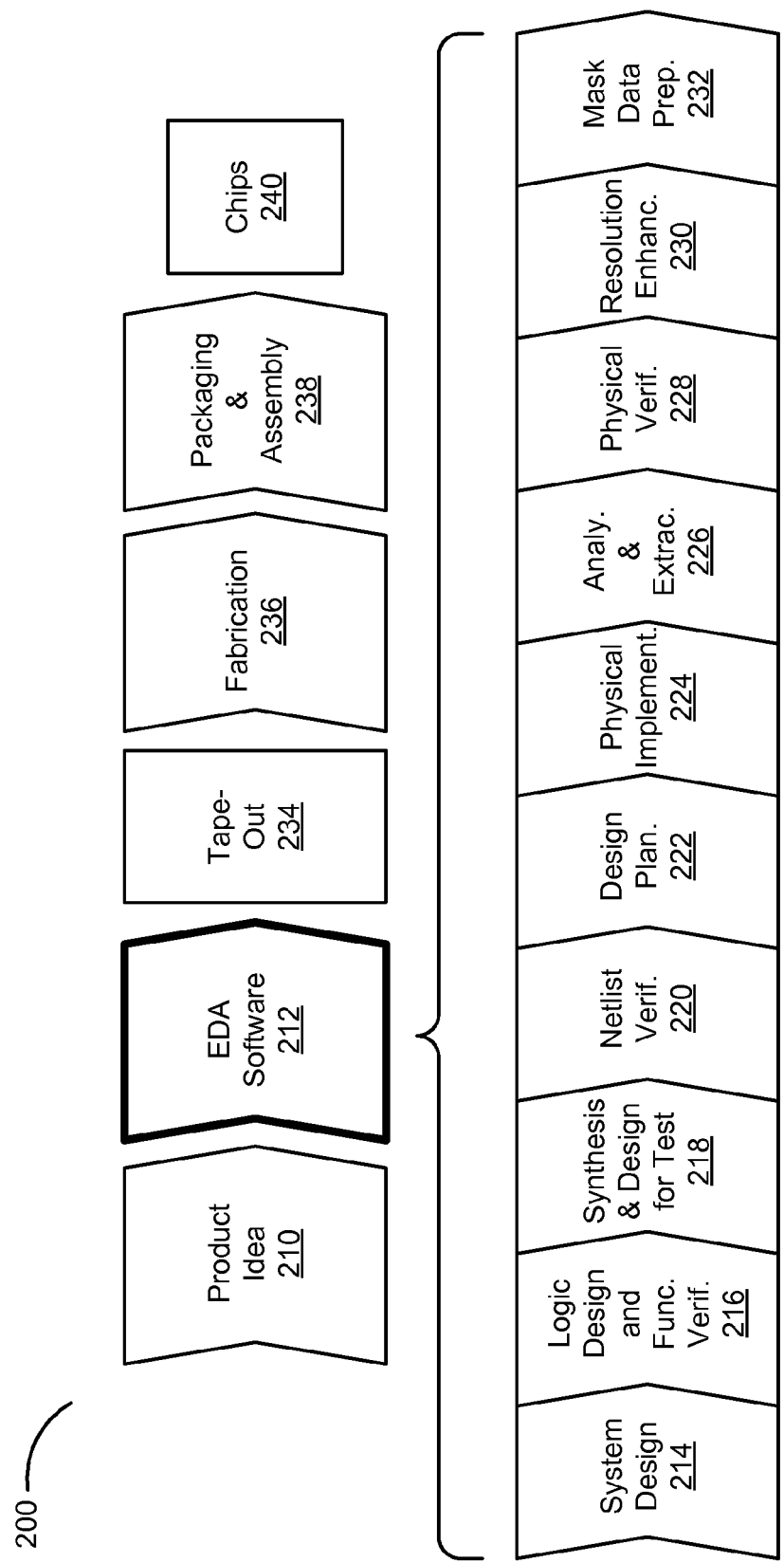
FIG. 2 illustrates one embodiment of an EDA design flow.

FIG. 2 is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions in the computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, in some embodiments the present disclosure can be used in EDA software 212 that includes operations between design planning 222 and physical implementation 224.

Cell and Cell Block Configuration

Figure 3:
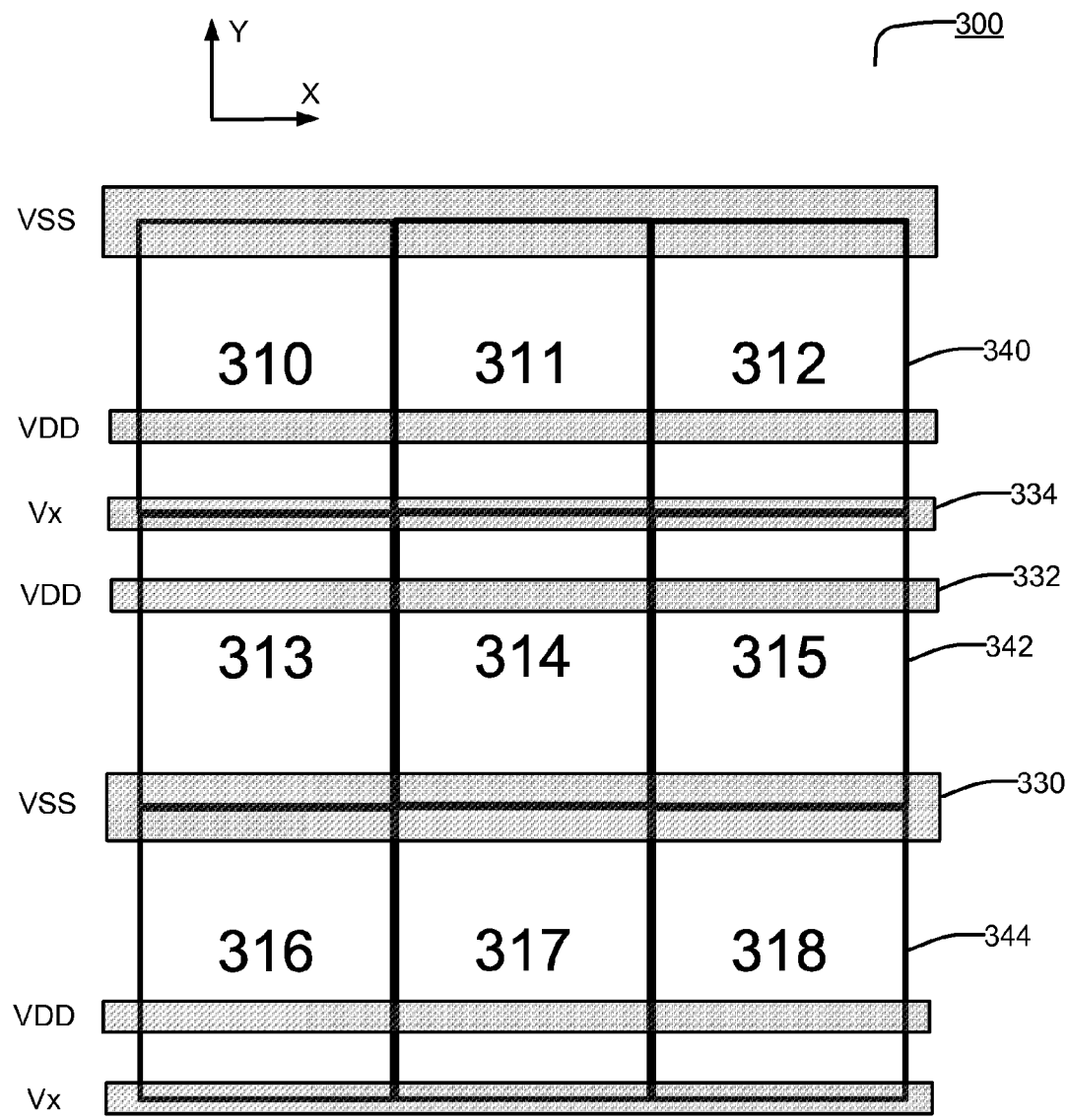
FIG. 3 illustrates one embodiment of a block of standard cells.

FIG. 3 illustrates one embodiment of a block 300 of standard cell instances. The block 300 of standard cell instances may represent a portion of a layout for an integrated circuit that is generated by the EDA software 212. The block 300 of standard cell instances may also represent a portion of a fabricated integrated circuit device. The block 300 of standard cell instances includes nine standard cell instances (e.g., 310, 311, 312, 313, 314, 315, 316, 317, 318) and several power rails (e.g., 330, 332, 334). The standard cell instances are organized into three adjacent rows (e.g., 340, 342, 344), where each row has three standard cell instances. In other embodiments, a block 300 of standard cell instances may have more rows and each row may have more than three standard cell instances.

The standard cell instances are meant to represent instances of any type of standard cells (e.g., NAND, NOR, flop). For purposes of illustration, many of the details (e.g., gates, diffusion, vias, connections to the transistors) of the cells have been omitted from FIG. 3. The cells are shown to have the same width, but in other embodiments, different types of cells may have different widths.

Standard cells within a standard cell library are designed with certain features that are consistent across the cells. In one embodiment, standard cells have fixed heights and fixed power rail locations. By having fixed heights and fixed power rail locations, instances of the standard cells (e.g., 313, 314, 315) may share a single power rail (e.g., 332) when placed in a row (e.g., 342). The standard cell instances in one row may be flipped upside down relative to cell instances in adjacent rows. By flipping the standard cell instances and placing a power rail along a boundary, standard cell instances in adjacent rows may share the power rail. For example, cell instance 311 may be a flipped version of cell instance 314, which allows cell instance 311 and cell instance 314 to share a single power rail 334.

A power rail 332 for carrying a VDD voltage potential is located along the interior of row 342 and is not shared with any other rows. A power rail 330 for carrying a VSS voltage potential is located along a boundary of row 342 and row 344 and is shared by the cell instances in these two rows. In other embodiments, the voltages carried by these rails are reversed such that power rail 332 carries a VSS voltage potential and power rail 330 carries a VDD voltage potential. In one embodiment, VDD and/or VSS are disabled during a standby mode to conserve power.

A power rail 334 for carrying a Vx (auxiliary) voltage potential is located along the boundary of row 340 and row 342 and is shared by the cell instances in these two rows. In one embodiment, Vx is a voltage potential that is separate from the primary source supplies (VDD or VSS). The primary source supplies may be switched on or off separately from Vx and/or Vx may have a different level of voltage potential compared to the primary source supplies. For example, Vx may represent one of the following: (1) a retention voltage potential (VDDR or VSSR) that stays on when the primary source supplies are turned off during a standby mode; (2) a voltage for biasing the well substrate of a transistor higher than the source voltage potential of that transistor to reduce power loss due to leakage; (3) a voltage for connecting to some of the cells in a row of cells to allow the cells to operate with different voltage potential requirements than neighboring cells; or (4) a voltage that provides other similar functions. In one embodiment, sharing the Vx power rail 334 between adjacent cell rows is beneficial because Vx power rail 334 occupies less space. The Vx power rail 334 does not carry a high amount of current, and hence, it is efficient to reduce the width of the Vx power rail 334. The minimum width of the Vx power rail 334 may be restricted by process design rules that set a minimum width for metal wires.

In one embodiment, the VSS power rail 330 is "wider" than the Vx power rail 334 and/or the dedicated VDD rail 332. The VSS power rail 330 is wider because the vertical width of the VSS power rail (i.e. the width in the Y direction) is greater than the vertical width of the Vx 334 and VDD 332 rails. Due to the configuration of the power rails, each VSS rail 330 carries approximately the same current as two VDD rails 332 and one Vx rail 334 combined. Thus, routing the VSS rail 330 to be wider than the VDD 332 and Vx rails 334 is beneficial for ensuring that the width of each power rail is appropriate for the amount of current that is carried by the power rail.

In one embodiment, power rails (e.g., 330, 332, 334) are routed on one or more metal layers. Integrated circuits include several layers of metal, such as a first, second, third, and fourth metal layers residing above a substrate. Each layer of metal is separated from another layer of metal by an insulating layer. The first metal layer M1 is nearest the substrate, and higher numbered layers are further from the substrate. For example, the second metal layer M2 is above the first metal layer M1, and the third metal layer M3 is above the second metal layer M2. In one embodiment, the VDD power rail 332 is routed as a trace in the second metal layer M2. This allows the first metal layer M1 to be used for internal signal connections from the region between VDD and VSS to the region between VDD and Vx. The remaining power rails 330 and 334 are routed on the first metal layer M1.

In one embodiment, the power rails (e.g., 330, 332, 334) are routed as metal traces on the second metal layer M2. In one embodiment, one or more of the power rails (e.g., 330, 332, 334) can be routed on multiple metal layers and periodically stitched together with vias that connect the metal layers to create a sandwich power rail. In one embodiment, the power rails are routed in a direction that is perpendicular to the gate electrodes (not shown) of the standard cell instances. For example, the power rails are routed in the X direction while the gates electrodes are oriented in the Y direction.

Figure 4A:
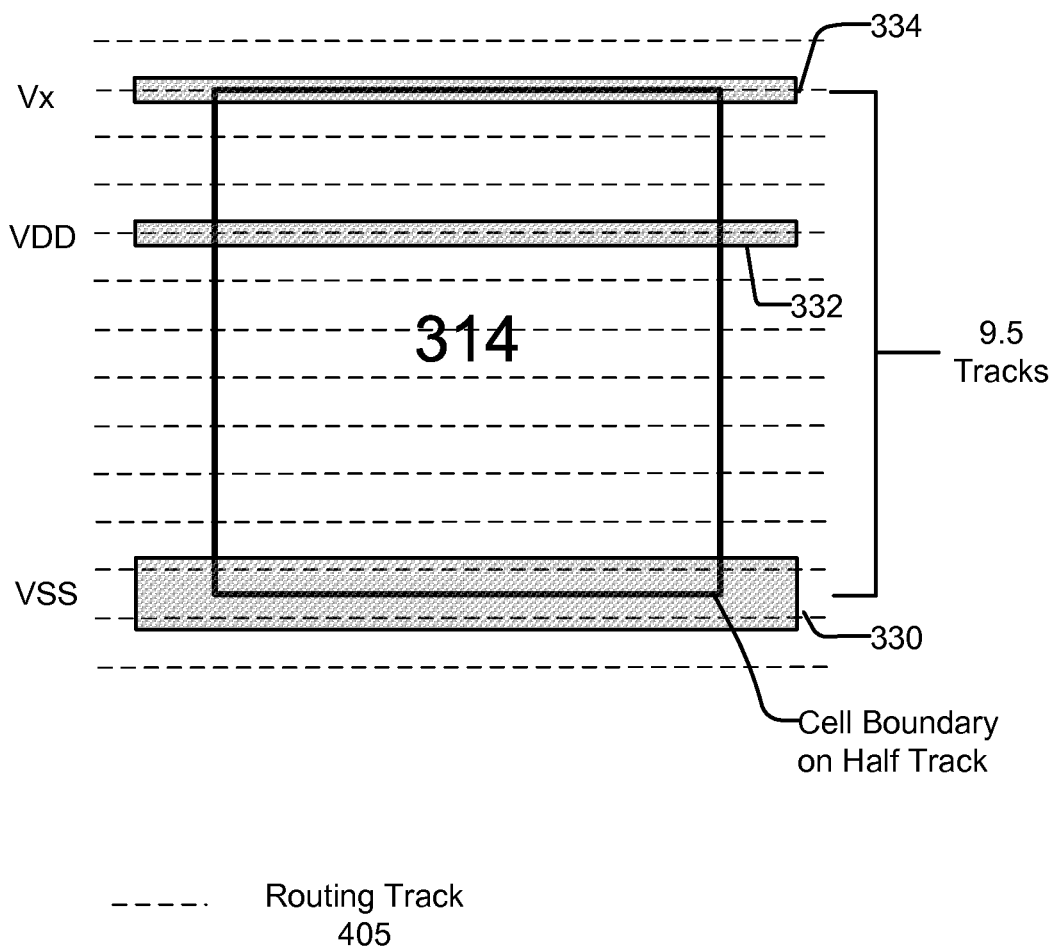
FIGS. 4A-4D illustrate embodiments of a standard cell.

FIG. 4A illustrates one embodiment of a standard cell 314. In one embodiment, the standard cell 314 is part of a library of cells that is used to create the layout in FIG. 3. Horizontal routing tracks 405 that are parallel to the top and bottom boundaries of the cell are overlaid on the standard cell as reference points for explaining the size of the cell 314 and the placement of the power rails within the cell. Routing tracks are reference lines that define the preferred center of metal wires within a given metal layer. The distance between adjacent routing tracks is the routing pitch. The routing pitch may change from one design to the next, depending on the configuration of the EDA software 212 and the requirements of a given manufacturing process. During physical implementation 224, the EDA software 212 places instances of standard cells 314 into a design and routes metal wires along the routing tracks to make chip-level connections between standard cells, thereby implementing a desired functionality of an integrated circuit. Standard cells are typically designed to accommodate routing tracks having a certain routing pitch, which helps to expedite the process of placing and routing connections between cells.

In FIG. 4A, a VDD power rail 332 is routed along an interior of the cell 314 and is one track wide. In other words, the VDD rail 332 occupies or blocks a single horizontal routing track. VSS power rail 330 is routed along the bottom boundary of the standard cell 314 and is two tracks wide. In other words, the VSS rail 330 occupies or blocks two horizontal routing tracks. A Vx power rail 334 is routed along the top boundary of the standard cell 314. The Vx power rail 334 is one track wide such that it blocks one horizontal routing track. When an instance of the cell 314 is placed into a block of cells, the VSS rail 330 and the Vx rail 334 are shared with cell instances in adjacent and abutting rows. The VSS rail 300 is wider than both the Vx rail 334 and the VDD rail 332, and is thus configured to carry a higher amount of current.

The height of the cell (i.e. the distance between the top and bottom cell boundaries) is 9.5 tracks, which is not an integral multiple of the routing pitch. Stated differently, the height of the cell is an odd multiple of half the routing pitch. The top boundary of the cell is located on a routing track. The bottom boundary of the cell is located on the half-track, i.e., between two adjacent routing tracks. Locating the top boundary of the cell on the routing track is beneficial for keeping the Vx rail 334 on the routing tracks. Locating the bottom boundary of the cell on the half-track is also beneficial for keeping the VSS rail 330 on the routing tracks. The layout of FIG. 4A results in eight free routing tracks available for signal routing over the interior of the cell 314.

By contrast, a conventional approach for adding a Vx rail to a cell is to increase the height of the cell from 9 tracks to 10 tracks and to route VDD and VSS at the cell boundaries and Vx along the interior of the cell. However, adding a dedicated Vx rail while maintaining the same number of free routing tracks means increasing the cell height by one track. By sharing the Vx rail, the embodiment of FIG. 4A allows the cell height to only be increased by 0.5 tracks. Thus, the embodiment of FIG. 4A is approximately five percent smaller than a conventional cell.

Figure 4B:
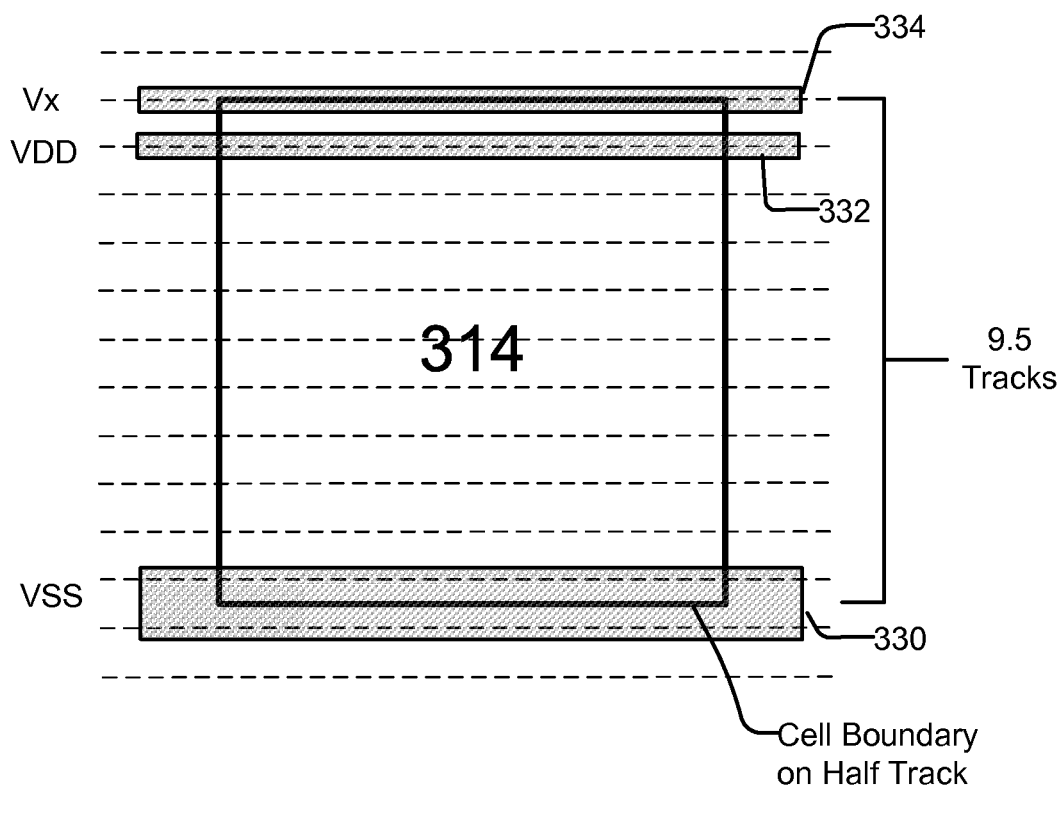

FIG. 4B illustrates another embodiment of a standard cell 314. The embodiment in FIG. 4B is similar to the embodiment in FIG. 4A, except that the VDD power rail 332 is now located on a routing track that is immediately adjacent to the Vx power rail 334. The embodiment in FIG. 4A has no free routing tracks between the VDD rail 332 and the Vx rail 334, whereas the embodiment in FIG. 4B has two free routing tracks between VDD and Vx to allow for routing of additional signal connections.

Figure 4C:
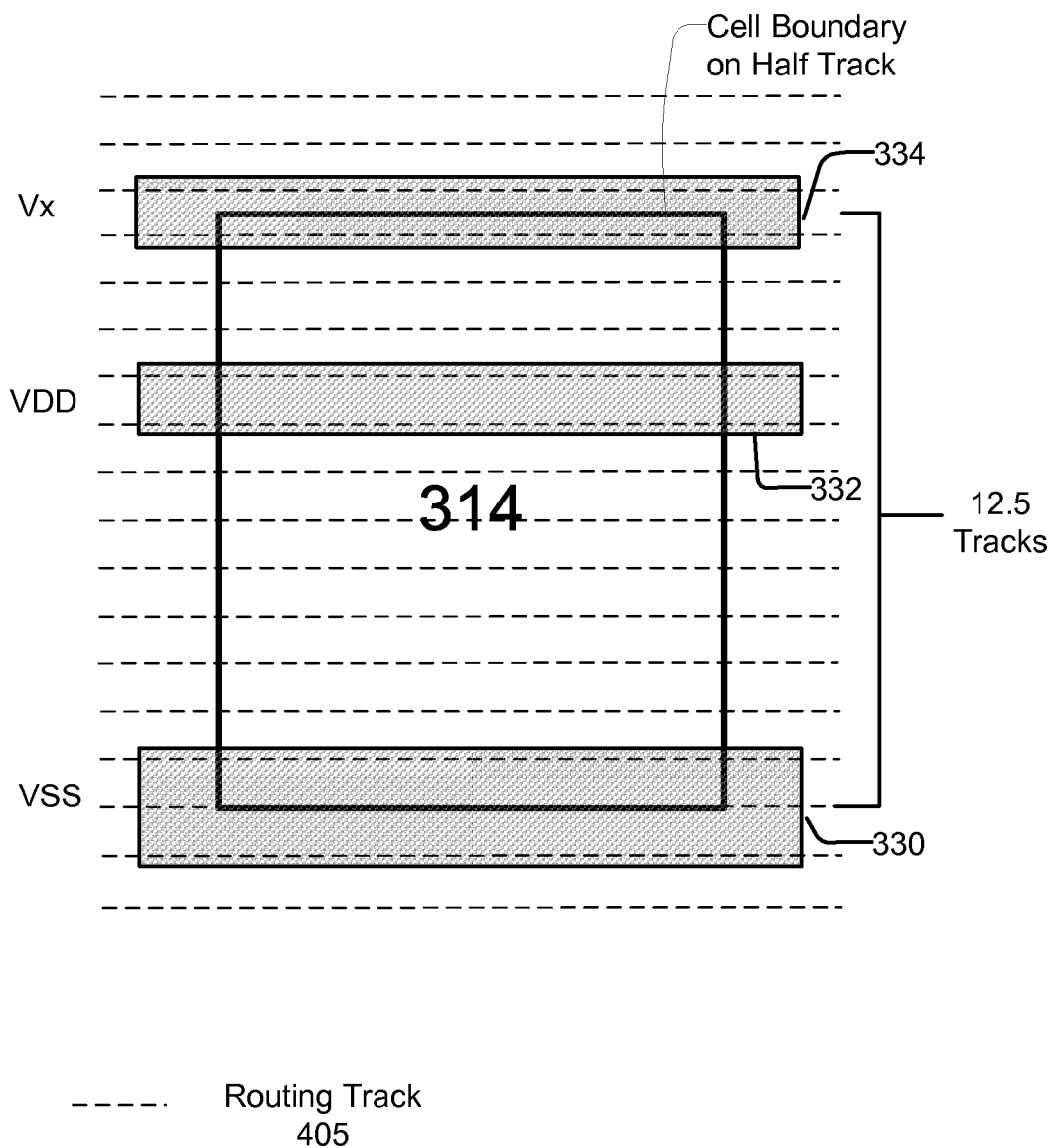

FIG. 4C illustrates still another embodiment of a standard cell 314. The embodiment in FIG. 4C is similar to the embodiment in FIG. 4A, except that the width of the power rails is increased. As shown, the Vx power rail 334 is now two tracks wide, the VDD power rail 332 is two tracks wide, and the VSS power rail 330 is three tracks wide. Wider power rails enable higher current carrying capacity, which may be needed for designs that consume a large amount of power. Because wider power rails occupy more space within the cell 314, the cell height is increased to 12.5 tracks to create room for internal cell connections (not shown).

Increasing the width of the power rails also affects the placement of the cell boundaries. The top boundary of the cell 314 in the embodiment of FIG. 4C is now on the half-track (i.e., between adjacent routing tracks) and the bottom boundary of the cell 314 is on a routing track. Placing the cell boundaries in this manner enables routing rails of different widths at the top and bottom boundaries while keeping the rails on the routing tracks for efficient routing. For example, the Vx power rail 334 is aligned with two routing tracks and VSS is aligned with three routing tracks.

Figure 4D:
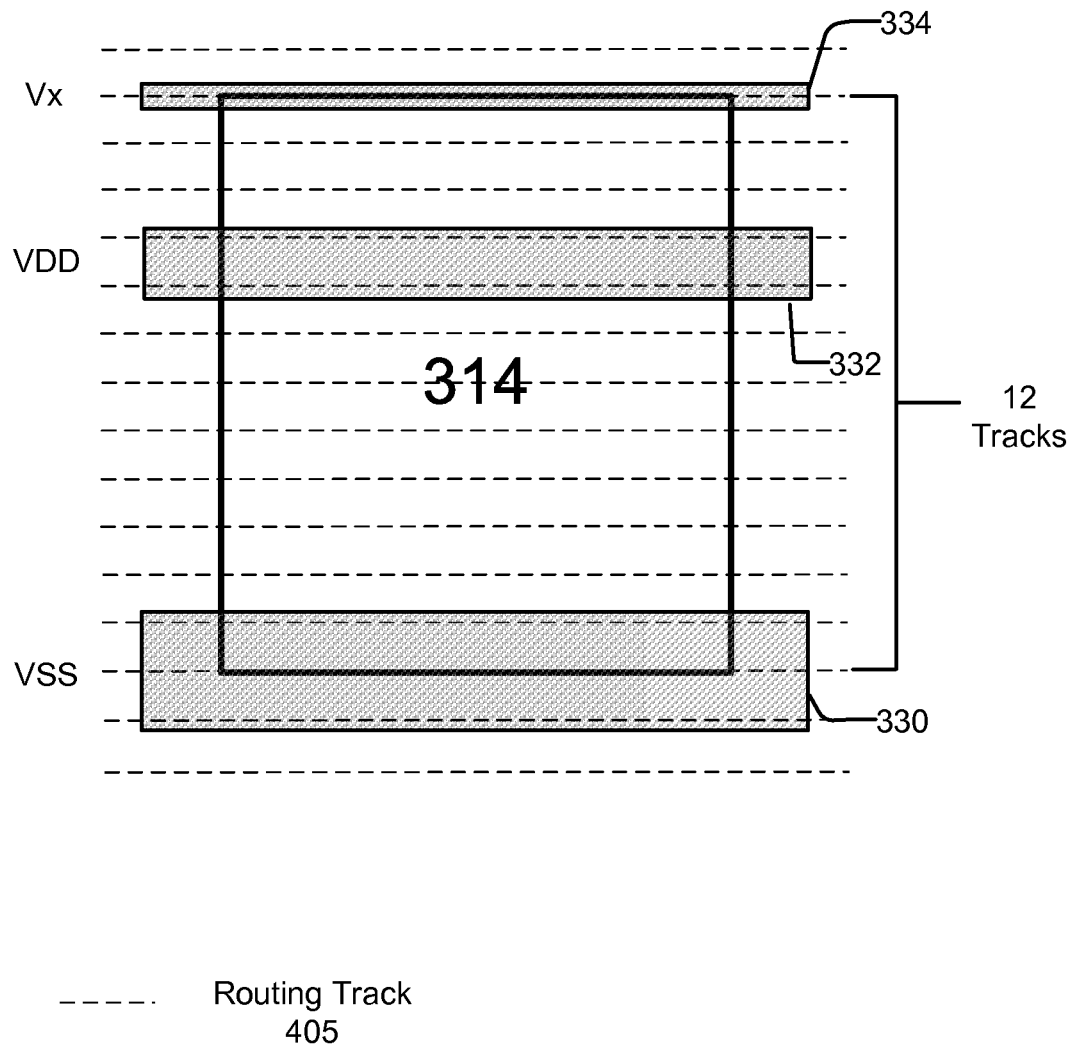

FIG. 4D illustrates a fourth embodiment of a standard cell 314 from FIG. 3. The embodiment in FIG. 4D is similar to the embodiment in FIG. 4A, except that the width of the VDD rail 332 and VSS rail 330 are increased to enable higher current carrying capacity. The width of the Vx rail 334 is not changed. As shown, the Vx rail 334 is still one track wide, the VDD rail 332 is now two tracks wide, and the VSS rail 330 is three tracks wide. Because wider power rails occupy more space within the cell, the cell height is increased to 12 tracks to create room for internal cell connections (not shown).

In FIG. 4D, both the top and bottom cell boundaries are now aligned with a routing track and the height of the cell 314 is an integral multiple of the routing pitch (e.g., 12 tracks tall). The new placement of the cell boundaries keeps the power rails aligned with the routing tracks. For example, the Vx rail 334 is aligned with one routing track and the VSS rail 330 is aligned with three routing tracks. Placing the cell boundaries in this manner enables routing rails of different widths at the top and bottom boundaries while keeping the rails on the routing tracks for efficient routing.

In the embodiments of FIGS. 4C and 4D, there is at least one free routing track between the VDD 332 and Vx 334 rails. In other embodiments, the VDD rail 332 may be located adjacent to the Vx rail 334 so that there are no free routing tracks between Vx 334 and VDD 332.

As shown in the various embodiments of FIG. 4A-4D, the cells are configured so that when instances of the cells are placed into an integrated circuit design, a Vx rail is shared between adjacent rows of cell instances to reduce the height of cell rows when a Vx rail is used. Additionally, the width of VSS, VDD, and Vx rails are adjusted to accommodate for different current carrying requirements. To enable routing of power rails of different widths at the top and bottom of the cells while keeping the rails on the routing track for efficient routing, the placement of the cell boundaries directly corresponds to the width of the power rails. Generally speaking, if a power rail has an odd track width (e.g., 1, 3, 5), the cell boundary for that power rail is placed on the half track. If a power rail has an even track width (e.g., 2, 4, 6), the cell boundary for that power rail is on track.

Method of Generating Cells and an IC Layout

Figure 5:
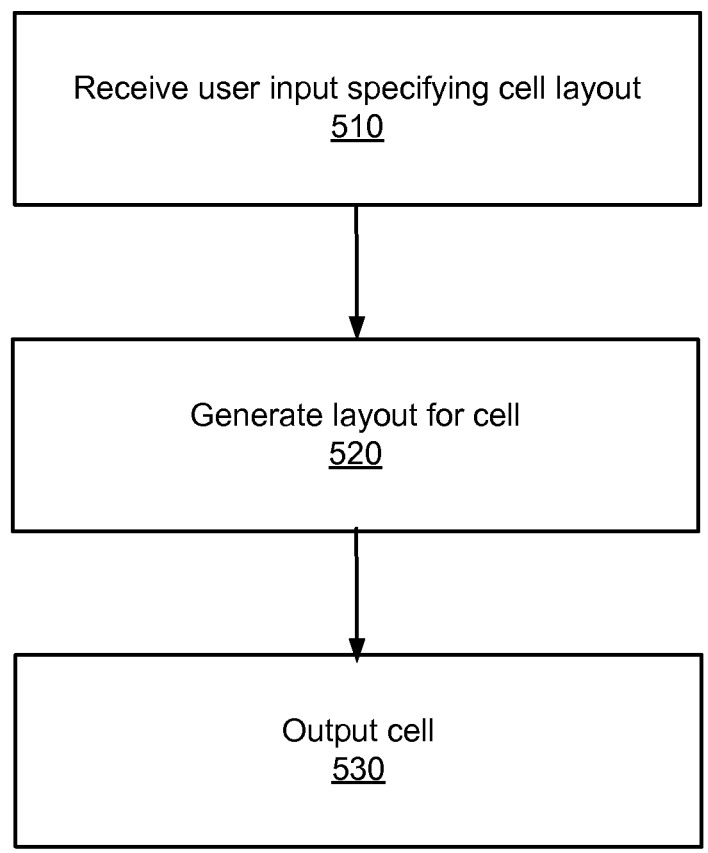
FIG. 5 illustrates one embodiment of a method for creating a library of standard cells.

FIG. 5 is one embodiment of a method for creating a library of standard cells. The method may be performed, for example, by an interactive software tool that is used by a cell designer to create a library of cells. In one embodiment, the tool receives 510 receives a user input specifying a layout for a standard cell. The user input may specify the shape and location of objects in the cell (e.g., cell boundary, location and width of power traces, gates, active areas). In response to the user input, the tool generates 520 a layout for the cell. In one embodiment, the generated cells have layouts that resemble or match the cell configurations from FIGS. 4A-4D. For example, the cell may have several power rails routed on the boundaries and across the interior of the cell for carrying power supply voltages. The tool then outputs 830 the cells, for example, by storing the cells to disk as part of one or more cell libraries. The process may be repeated to generate a cell library that includes a large number of standard cells implementing different functions.

Figure 6:
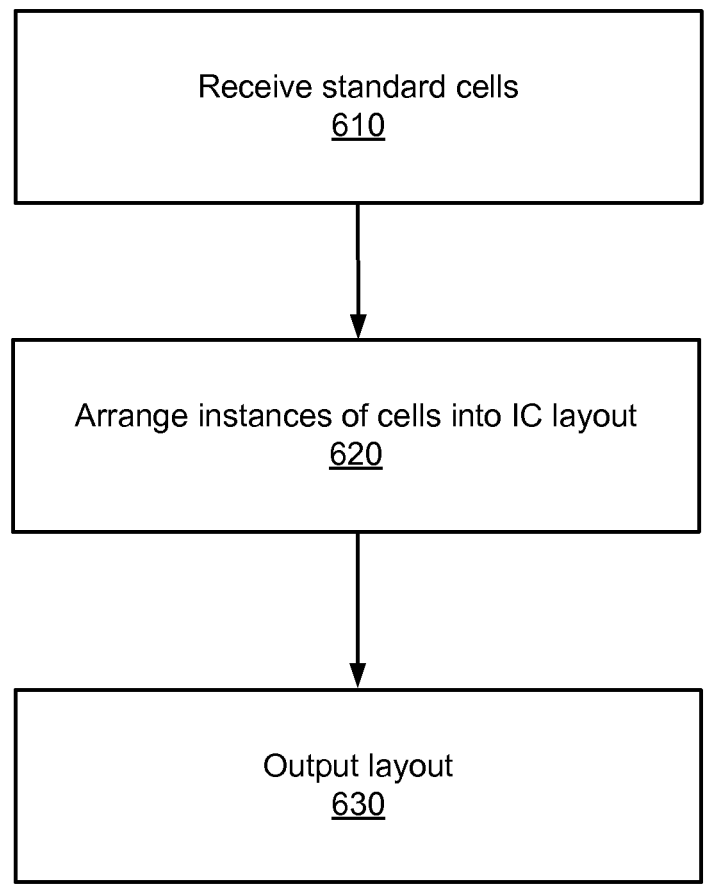
FIG. 6 is a flowchart that illustrates one embodiment of a method for generating a layout for an integrated circuit.

FIG. 6 is one embodiment of a method for generating a layout (i.e. representation of) for an integrated circuit. In one embodiment, the method is performed by the EDA software 212 during design planning 222 or physical implementation 224. In one embodiment of the method, the EDA software 212 receives 610 one or more standard cells. For example, the cells may be stored in a computer readable medium of computer 100 as part of a standard cell library and loaded into memory by the EDA software 212, or the cells may be retrieved by the EDA software 212 from another computer 100 over a network.

The EDA software 212 generates a layout (i.e. representation of) for a block of an integrated circuit by arranging 620 instances of the standard cells into rows of cells. In one embodiment, the resulting layout resembles the layout shown in FIG. 3. For example, the cell instances may be arranged into a first row 340 of cell instances that are adjacent and abutting to a second row 342 of cell instances along a boundary. The first 340 and second 342 rows of cell instances share a power rail 334 (e.g., Vx) that extends along the boundary. A third row 344 of cell instances may be adjacent to and abutting to the second row 342 of cell instances along another boundary. The second and third rows of cell instances share a different power rail 330 (e.g., VSS) that extends along the another boundary. An additional power rail 332 (e.g., VDD) extends across an interior of the second row 342 of cell instances. The layout of the cell block is then output 630, which can include storing the layout to a non-transitory computer readable medium.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The various operations of example methods described herein, such as those performed by the compiler, may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules.

The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to improve the clarity of this disclosure. This description should be read to include one or at least one and the singular also includes the plural unless it is obvious that it is meant otherwise.

Upon reading this disclosure, those of skill in the art will appreciate still additional alternative structural and functional designs for a cell-based architecture of an integrated circuit through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An integrated circuit implementing a cell-based architecture comprising:
   a row of cell instances bordering a first adjacent row of cell instances along a first boundary and a second adjacent row of cell instances along a second boundary, a distance between the first boundary and the second boundary being a non-integral multiple of a routing pitch, the routing pitch being a distance between adjacent routing tracks of routing tracks that extend parallel to the first and second boundaries;
   a first power rail extending along the first boundary;
   a second power rail extending along the second boundary, wherein the second power rail is wider than the first power rail; and
   a third power rail extending across an interior of the row of cell instances.

2. The integrated circuit of claim 1, wherein the non-integral multiple is an odd multiple of half of the routing pitch.

3. The integrated circuit of claim 1, wherein the first power rail occupies an odd number of the routing tracks that extend parallel to the first and second boundaries, and the first boundary is located on one of the routing tracks.

4. The integrated circuit of claim 1, wherein the first power rail occupies an even number of the routing tracks that extend parallel to the first and second boundaries, and the first boundary is located between two adjacent routing tracks of the routing tracks.

5. The integrated circuit of claim 1, wherein the second power rail occupies an odd number of the routing tracks that extend parallel to the first and second boundaries, and the second boundary is located on one of the routing tracks.

6. The integrated circuit of claim 1, wherein the second power rail occupies an even number of the routing tracks that extend parallel to the first and second boundaries, and the second boundary is located between two adjacent routing tracks of the routing tracks.

7. The integrated circuit of claim 1, wherein the first power rail is configured to carry an auxiliary voltage potential.

8. The integrated circuit of claim 7, wherein the auxiliary voltage potential is powered on during both first and second periods of time, and at least one of the second and third power rails is configured to carry a voltage potential that is powered on during the first periods and powered off during the second periods.

9. The integrated circuit of claim 1, wherein the second power rail is wider than the third power rail.

10. The integrated circuit of claim 1, wherein the second power rail is configured to carry a VSS voltage potential and the third power rail is configured to carry a VDD voltage potential.

11. An integrated circuit implementing a cell-based architecture comprising:
- a row of cell instances bordering a first adjacent row of cell instances along a first boundary and a second adjacent row of cell instances along a second boundary, a distance between the first and second boundary being an integral multiple of a routing pitch, the routing pitch being a distance between adjacent routing tracks of routing tracks that extend parallel to the first and second boundaries;
- a first power rail extending along the first boundary;
- a second power rail extending along the second boundary, wherein the second power rail is wider than the first power rail; and
- a third power rail extending across an interior of the row of cell instances.

12. A non-transitory computer-readable medium storing a cell library that comprises a plurality of cells for an integrated circuit design, each of the cells comprising:
- a first power rail extending along a first boundary of the cell;
- a second power rail extending along a second boundary of the cell that is opposite from the first boundary, wherein the second power rail is wider than the first power rail and a distance between the first boundary and the second boundary is a non-integral multiple of a routing pitch, the routing pitch being a distance between adjacent routing tracks of routing tracks that extend parallel to the first and second boundaries; and
- a third power rail extending across an interior of the cell.

13. The computer-readable medium of claim 12, wherein the non-integral multiple is an odd multiple of half of the routing pitch.

14. The computer-readable medium of claim 12, wherein the first power rail is configured to occupy an odd number of the routing tracks that extend parallel to the first and second boundaries, and the first boundary is configured to be located on one of the routing tracks.

15. The computer-readable medium of claim 12, wherein the first power rail is configured to occupy an even number of the routing tracks that extend parallel to the first and second boundaries, and the first boundary is configured to be located between two adjacent routing tracks of the routing tracks.

16. The computer-readable medium of claim 12, wherein the second power rail is configured to occupy an odd number of the routing tracks that extend parallel to the first and second boundaries, and the second boundary is configured to be located on one of the routing tracks.

17. The computer-readable medium of claim 12, wherein the second power rail is configured to occupy an even number of the routing tracks that extend parallel to the first and second boundaries, and the second boundary is configured to be located between two adjacent routing tracks of the routing tracks.

18. The computer-readable medium of claim 12, wherein the first power rail is configured to carry an auxiliary voltage potential.

19. The computer-readable medium of claim 18, wherein the auxiliary voltage potential is powered on during both first and second periods of time, and at least one of the second and third power rails is configured to carry a second voltage potential that is powered on during the first periods and powered off during the second periods.

20. The computer-readable medium of claim 12, wherein the second power rail is wider than the third power rail.

21. The computer-readable medium of claim 12, wherein the second power rail is configured to carry a VSS voltage potential and the third power rail is configured to carry a VDD voltage potential.

22. A non-transitory computer-readable medium storing a cell library that comprises a plurality of cells for an integrated circuit design, each of the cells comprising:
- a first power rail extending along a first boundary of the cell;
- a second power rail extending along a second boundary of the cell that is opposite from the first boundary, wherein the second power rail is wider than the first power rail and a distance between the first boundary and the second boundary is an integral multiple of a routing pitch, the routing pitch being a distance between adjacent routing tracks of routing tracks that extend parallel to the first and second boundaries; and
- a third power rail extending across an interior of the cell.

23. A method of generating a representation of an integrated circuit, the method comprising:
- receiving one or more cells from a cell library; and
- arranging instances of the one or more cells into a row of cell instances bordering a first adjacent row of cell instances along a first boundary and a second adjacent row of cell instances along a second boundary, a distance between the first boundary and the second boundary being a non-integral multiple of a routing pitch, the routing pitch being a distance between adjacent routing tracks of routing tracks that extend parallel to the first and second boundaries,
- the instances of the one or more cells being arranged to form a first power rail extending along the first boundary, a second power rail wider than the first power rail extending along the second boundary, and a third power rail extending across an interior of the row of cell instances.

24. A method of generating a representation of an integrated circuit, the method comprising:
- receiving one or more cells from a cell library; and
- arranging instances of the one or more cells into a row of cell instances bordering a first adjacent row of cell instances along a first boundary and a second adjacent row of cell instances along a second boundary, a distance between the first boundary and the second boundary being an integral multiple of a routing pitch, the routing pitch being a distance between adjacent routing tracks of routing tracks that extend parallel to the first and second boundaries,
- the instances of the one or more cells being arranged to form a first power rail extending along the first boundary, a second power rail wider than the first power rail extending along the second boundary, and a third power rail extending across an interior of the row of cell instances.

* * * * *